United States Patent

Striegl et al.

[15] 3,659,745
[45] May 2, 1972

[54] MANUALLY OPERATED FOOD PACKAGE DISPENSER WITH AUTOMATIC SLOW DOOR CLOSING

[72] Inventors: George Striegl, Prescott; Otto Timm, Spenceville, both of Ontario, Canada

[73] Assignee: Otto Timm, Manfried Timm, Irving Richer and Leonard Rabinovitch, trading as Mini Millboard Advertising Regd., Montreal, Quebec, Canada

[22] Filed: Apr. 21, 1970

[21] Appl. No.: 30,521

[52] U.S. Cl. ............................................................221/12
[51] Int. Cl. ........................................................A47f 1/06
[58] Field of Search ....................221/12; 49/139; 194/Dig. 6

[56] References Cited

UNITED STATES PATENTS 3,357,133  12/1967  Helsing..................................221/12 X
3,549,045  12/1970  Rosenhagen..........................221/12

Primary Examiner—Stanley H. Tollberg
Attorney—Pierre Lesperance

[57] ABSTRACT

A food package dispenser, more particularly of sugar bags, and for use on restaurant tables. This dispenser forms an open top receptacle for receiving the food packages. A normally closed cover for said receptacle opens upon operation of a lever and closes slowly upon release of the lever to give sufficient time for the operator to move his hand from the lever to the receptacle to grasp a package therein. Automatic closing of the cover keeps the packages in sanitary condition. The dispenser also displays advertising messages which are replaced by other such messages each time the lever is operated to open the cover.

6 Claims, 15 Drawing Figures

Patented May 2, 1972
3,659,745
3 Sheets-Sheet 1
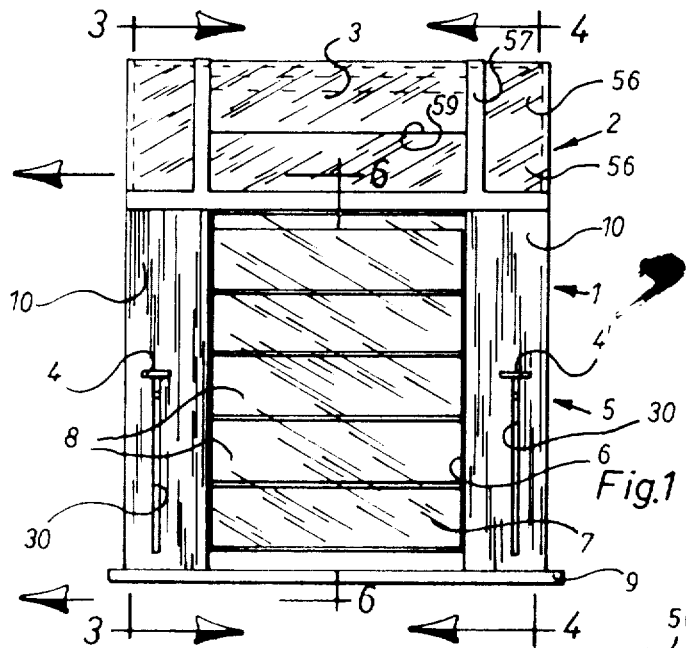
Fig.1
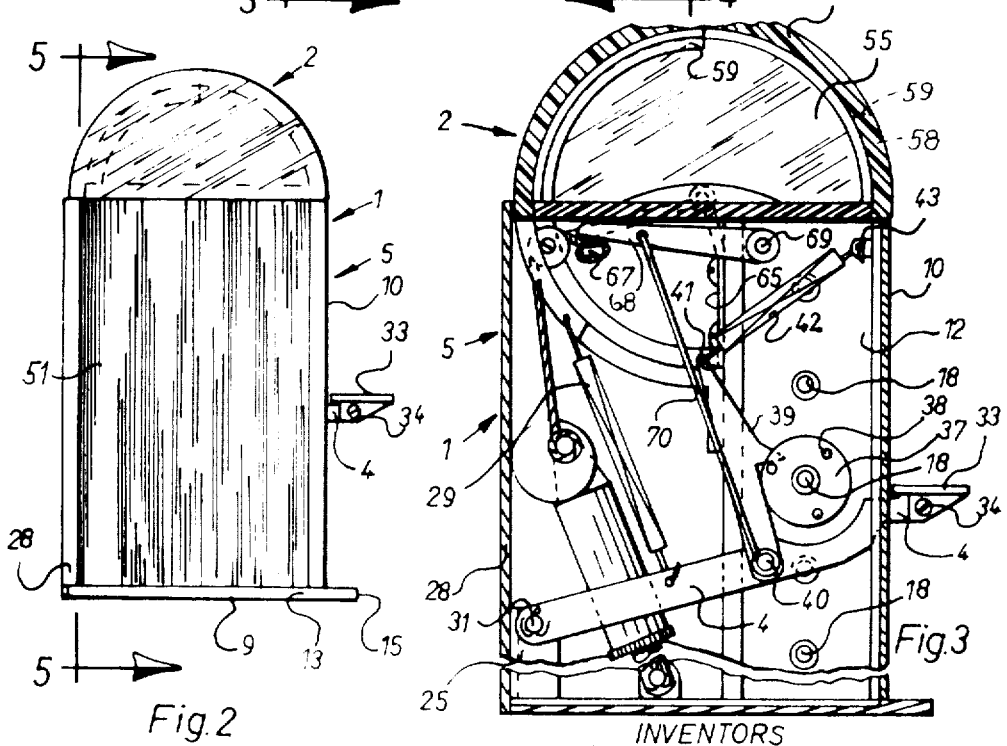
Fig.2
Fig.3
INVENTORS
George STRIEGL
Otto TIMM
BY Pierre Lesperance
AGENT

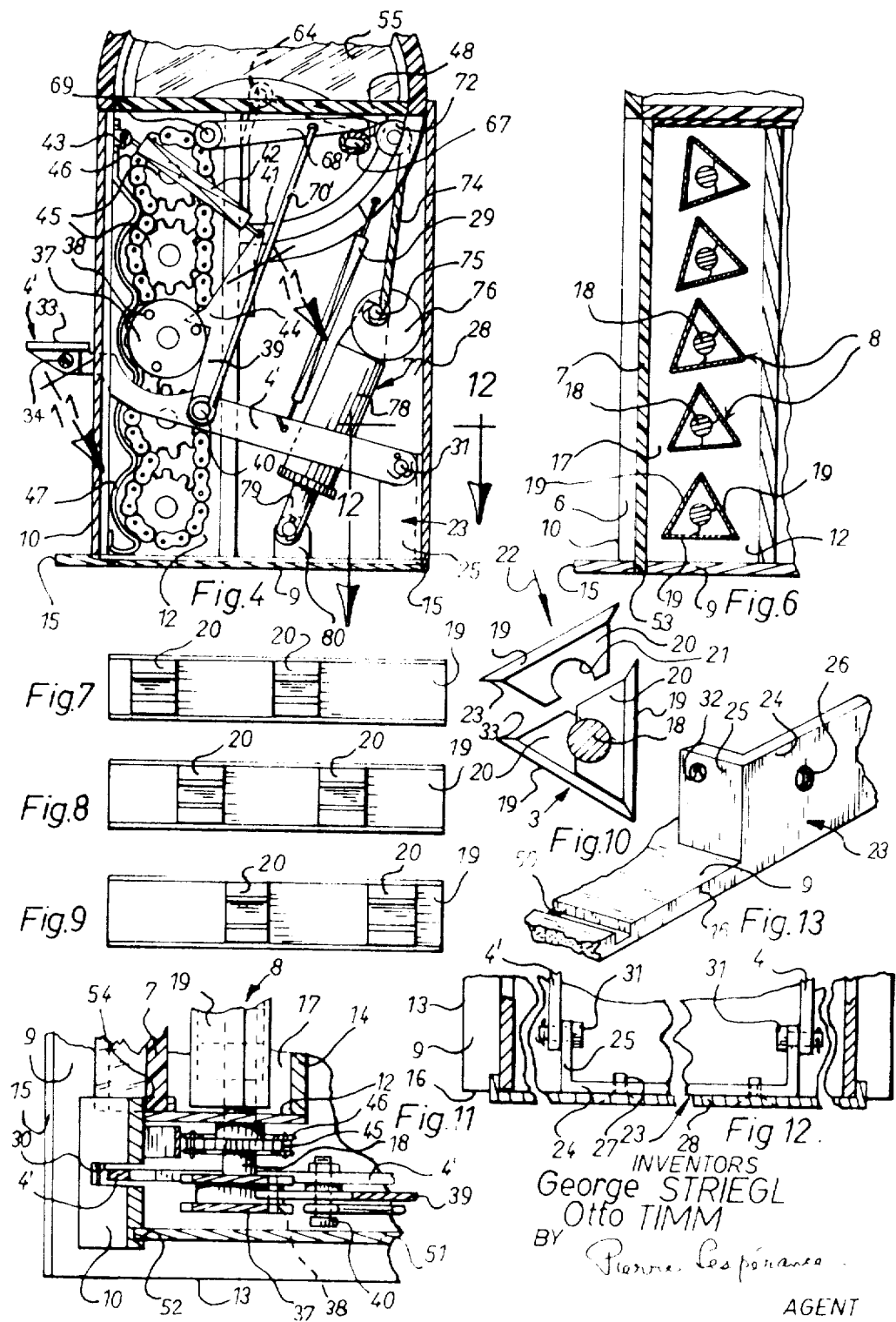

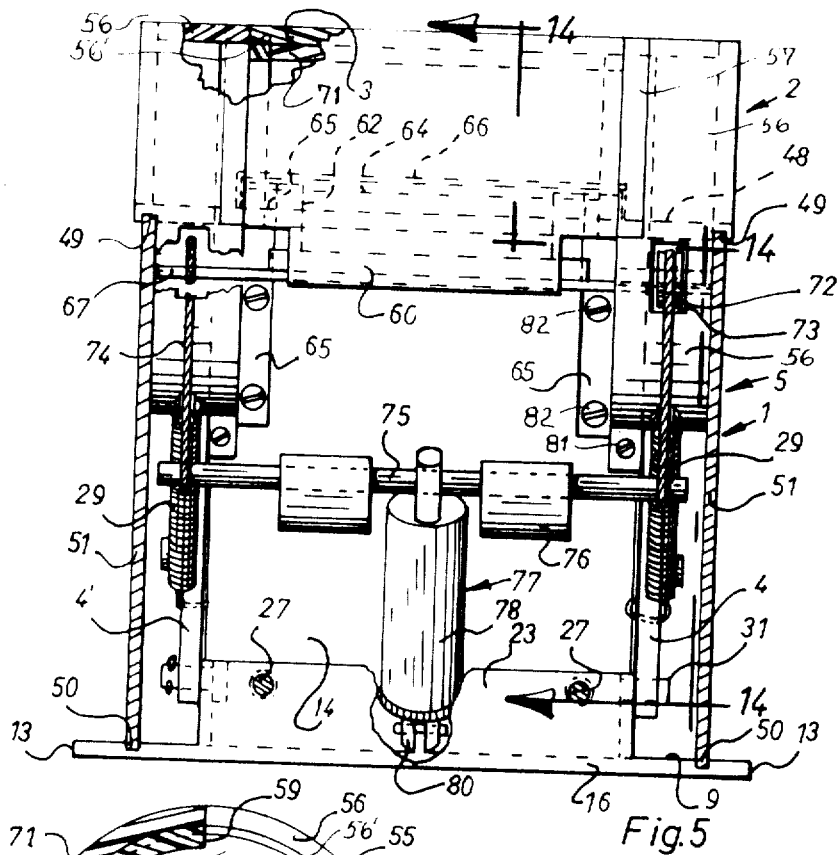
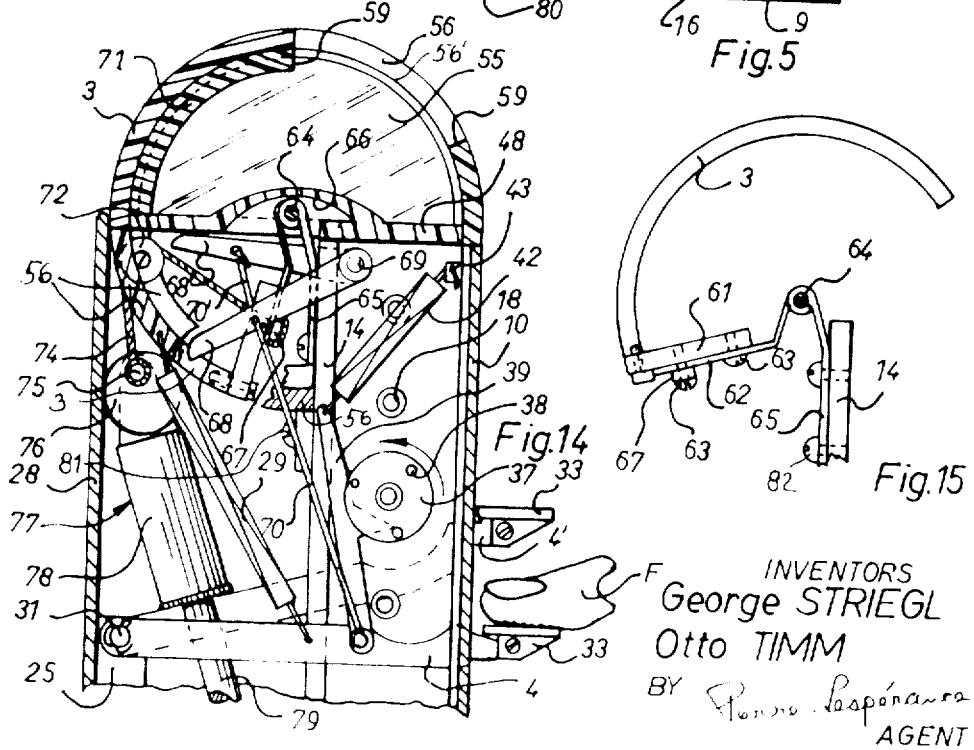

MANUALLY OPERATED FOOD PACKAGE DISPENSER WITH AUTOMATIC SLOW DOOR CLOSING

The present invention relates to a food package dispenser and, more specifically, to such a dispenser which is adapted to be placed on restaurant tables for dispensing, for instance, sugar bags.

It is known to provide bowls for containing sugar bags and the like, adapted to be placed on a restaurant table or counter. These bowls are provided with a cover to keep the sugar bags in clean and sanitary condition. These covers require to be closed by hand and they are naturally frequently left open with consequent soiling of the bowl contents.

A general object of the invention resides therefore in a food package dispenser which obviates the above-noted disadvantages and, more particularly, which is provided with a cover normally in closed position and openable upon manual operation of an actuator release of said actuator results in the automatic closing of the cover at a slow enough speed to permit time for the operator's hand to move from the actuator to the inside of the dispenser to grasp a food package therein, whereby the dispenser can be operated by only one hand.

Another object of the invention resides in the provision of a dispenser of the character described, adapted to be placed on a table in restaurants or the like, comprising two laterally spaced actuators each accessible from one side of a table and each independently operable to open the closure, so arranged that, while the dispenser has the convenience of being capable of operation from either side thereof, the mechanism set in motion at anyone time to open the closure is of light weight construction, requiring very light force to be exerted for its operation, for instance the force exerted by the tip of a finger.

Another object of the invention resides in the provision of a food package dispenser of the character described, in which the receptacle for receiving the food packages is supported well above table top level to further keep the packages in sanitary and clean condition, the part of the casing below the receptacle providing a window through which may be seen advertising material.

Another object of the invention resides in the provision of a dispenser of the character described, in which the advertising material appearing through the window is arranged on movable elements which rotate each time an actuator is operated to open the closure, so as to change the advertising material visible through the window.

Another object of the invention resides in the provision of a dispenser of the character described, provided with means to easily change the advertising panels.

The foregoing and other objects of the invention will become more apparent during the following disclosure and by referring to the drawings, in which:

FIG. 1 is a front elevation of the dispenser of the invention;
FIG. 2 is a side elevation;
FIG. 3 is a cross-section, partially cut away, taken along line 3—3 of FIG. 1;
FIG. 4 is a partial cross-section taken along line 4—4 of FIG. 1;
FIG. 5, seen in the last page of the drawings, is a plan section at the back of the dispenser, taken along line 5—5 of FIG. 2 and showing the cover in closed position;
FIG. 6, seen on the second sheet of drawings, is a partial cross-section, taken along line 6—6 of FIG. 1;
FIGS. 7, 8 and 9 are back elevations of the three advertising panels for constituting an advertising unit;
FIG. 10 is an end elevation of the advertising unit showing one of the three advertising panels about to be fitted on the shaft;
FIG. 11 is a partial plan section taken along line 11—11 of FIG. 4;
FIG. 12 is a partial plan section taken along line 12—12 of FIG. 4;
FIG. 13 is a partial perspective view of the lower bottom part of the casing and which is shown in FIG. 12;
FIG. 14 is a partial cross-section taken along line 14—14 of FIG. 5, but showing the cover in open position; and
FIG. 15 is a side elevation of the closure and its mounting bracket.

In the drawings, like reference characters indicate like elements throughout.

The dispenser of the invention comprises a casing 1 defining in its upper part a receptacle 2 adapted to receive food packages, such as individual sugar bags as found in restaurants. The receptacle 2 has a cover 3 which can be open to have access within the receptacle 2 to grasp a sugar bag and retrieve it therefrom. Closure 3 is operated by depressing one or the other of an actuator 4 or 4' located at the front of the lower part of casing 1, said lower part being indicated at 5 and housing the mechanism for transmitting the movement of actuators 4,4' to the closure 3 for opening the closure and also housing the mechanism for the slow closing of the closure 3. The lower casing part 5 serves also to support the receptacle 2 at a certain distance above the level of the table top on which the casing 1 rests. Furthermore, the casing lower part 5 defines an advertising window 6 extending between the two actuators 4, 4' at the front part of the casing 1. Advertising window 6 is closed by a transparent pane 7 through which may be seen advertising messages appearing on each of several advertising units 8. Lower casing part 5 also houses mechanism to change the position of the advertising units 8 and operated by actuator 4 or 4', so that new advertising messages appear each time the closure 3 is open.

The casing lower part 5 comprises a generally rectangular flat base plate 9, adapted to directly rest on a table top or the like.

Uprights 10 are secured to the front corners of base plate 9 (see FIGS. 1, 2, and 11) and form the front wall of casing lower part 5 and extend laterally of the window opening 6. A pair of walls 12 extend rearwardly from the inner edges of uprights 10 (see more particularly FIG. 11, which shows one wall 12, the other being identical) are secured to uprights 10 and to base plate 9 in vertical position and extend spaced from and parallel to the lateral edges 13 of base plate 9. The two walls 12, one on each side of window opening 6, are joined together at their rear edge by a partition 14 extending across the base plate 9 and parallel to the front edge 15 thereof. This partition wall 14 is nearer the front edge 15 than the back edge 16 of the base plate 9.

Walls 12 and 14 define in the lower casing part 5 a chamber 17, in which are disposed the advertising units 8. Units 8 comprise a plurality of horizontally disposed shafts 18 (see FIGS. 6 to 10) extending across the chamber 17 and journalled in the side walls 12 of said chamber, the several shafts arranged in a vertical row at equal distances apart and each carrying three advertising panels 19 removably supported on a shaft 18 by a pair of clips 20 of resilient material, each defining a circular recess 21, of the same diameter as shaft 18 but extending only through slightly more than half a circle, so that they may be fastened on the shaft by pressure exerted on the panel in the radial direction, as shown by arrow 22 in FIG. 10.

The longitudinal edges of the rectangular shape advertising panels 9 are cut at a bevel 23 to fit the same bevelled edge face of an adjacent panel, the three panels arranged to form an equilateral triangle, when seen in cross-section, and fitted on the shaft.

The clips 20 of anyone panel of the three panels to be fitted on the same shaft 18 are longitudinally offset with respect to the clips of the remaining panels of the same assembly, so as to fit between each other on the shaft when the panels are assembled, the clips being interdigitated, which would be realized from a comparison of FIGS. 7, 8, and 9. Thus, the panels are transversely aligned on their shaft 18.

Means are provided, upon actuation of either actuator 4, 4', to rotate the shafts 18 in synchronized manner through 120° to successively expose to view through transparent pane 7, each one of the three advertising panels on each shaft 18. These means will be described hereinafter.

As shown in FIG. 6, the positions of the advertising panels on the successive shafts 18 are slightly angularly shifted so that the panel on the lower shaft will be facing upwardly at a steeper angle than the upper panel for a better view of these panels by persons sitting at a table on which the dispenser is placed, and who would normally have their head well above the top of the dispenser.

The base plate 9 is provided along its back edge 16 with an upright flange 23, of U-shaped cross-section, as shown in FIGS. 4, 12, and 13, providing a bight portion 24 parallel to back edge 16 and side legs 25 extending a short distance forwardly of the base plate and parallel to the lateral edges 13. This U-shaped flange 23 is disposed in the center zone of the base plate and is preferably integral therewith. Flange 23 terminates at a short distance above base plate 9.

The bight 24 is provided with a pair of screw holes 26 for receiving screws 27 which serve to secure a back plate 28 constituting the back wall of the casing 1.

The actuators 4 and 4' (see FIGS. 3 and 4) each consist of a lever freely extending through a vertical slot 30 made in the upright 10 at the front of the casing 1, extending rearwardly of the casing, substantially parallel to the side edges 13 of base plate 9 and pivotally connected at their rear end by a pin 31 engaging a hole 32 (see FIG. 13) made in side leg 25 of U-shaped flange 23.

The front end of each actuator lever 4, 4' protrudes from the upright 10 and is provided with a tab 33 secured thereon by a screw or the like 34.

As shown in FIGS. 4 and 11, a ratchet wheel 37 is secured to one of the shafts 18 on the outside of chamber 17 and consists of two spaced parallel discs, through which extend three pins 38 coaxial with the axis of the shaft 18 and angularly spaced at 120°.

A lever 39 is pivoted at 40 to actuator lever 4', extends upwardly and has its outer end 41 attached to a tension spring 42, the other end of the latter being attached at 43 to the associated upright 10. Lever 39 carries a pawl tooth 44 engageable with the top of a pin 38 with the side of the pawl lever 39 engaging the same pin under action of spring 42. Thus, depression of actuator lever 4' will cause the pawl tooth 44 to rotate through 120° ratchet wheel 37 and, consequently, the shaft 18 to which said wheel is secured.

Upon release of actuator lever 4', a return spring 29 urges the latter to move upwardly to its upper limit position and, during this movement, the inclined edge of lever 39 just above pawl 2, will eventually slide on the next pin to engage the top thereof under the action of tension spring 42.

The other actuating lever 4 on the other side of casing 1 and shown in FIG. 3, is similar to actuator lever 4 in its construction and operation and is similarly provided with a return spring 29 and with a pawl lever 39 engageable with a ratchet wheel 37 at the opposite end of shaft 18, the pawl lever 39 being urged forwardly by tension spring 42.

In order to transmit the rotation of the shaft provided with the two ratched wheels 37 to the remaining shafts, all of the shafts protrude from wall 12 on the side of the casing provided with actuator lever 4' and their projecting ends carry sprocket gears 45 meshing with a common endless chain 46 of the roller type, said chain being maintained in taut condition by a leaf spring 47 having a wavy form to slidably engage the portions of the chains between the various gears 45 at the front of said gears, leaf spring 47 acting as a chain tightener. Thus, shafts 18 rotate synchronously and through the same angle and are always maintained in the same angular relationship. The length of the slot 30 through which levers 4, 4' extend determines the extent of rotation of the shafts, that is they rotate through 120°.

Receptacle 2 has a bottom wall 48 secured to and supported in horizontal position on top of uprights 10, walls 12 and partition wall 14. It is substantially coextensive with base plate 9 and parallel thereto. This bottom wall 48 has lateral grooves 49 at its underside in register with lateral grooves 50 of base plate 9 for receiving slidable side walls 51 closing the sides of the casing 1 (see FIGS. 5, 11, 12, and 13).

The front edge of each side wall 51 removably engages a rearwardly facing vertical groove 52 formed in the upright 10, as shown in FIG. 11. Once the side walls 51 are in position, the back wall 28 is screwed to flange 23 and overlaps the side walls, as shown in FIG. 12.

The transparent pane 7, which closes the window opening 6, can be removed for having access to the advertising panels 19 to remove the same, if so desired, in order to replace them with panels bearing other advertising messages. For this purpose, the bottom plate 9 has a slot 53, as shown in FIG. 6, coextensive with the width of the pane 7 and through which the pane can be inserted and slid in guideways 54, shown in FIG. 11, formed at the junction of uprights 10 with walls 12 and the top edge of pane 7 finally abuts against the bottom wall 48 of receptacle 2, as shown in FIG. 6, where it is held in position by friction.

The receptacle 2 has a generally partially cylindrical shape, together with its cover 3. The receptacle 2 has lateral walls 55 having a semi-circular top edge, from which inwardly extend partially cylindrical receptacle wall portions 56 lined with decorative bands 57. Wall portions 56, together with intervening front and back partially cylindrical wall portions 58 and 71, define an upwardly extending opening 59 for receptacle 2.

The closure 3 has a partially cylindrical shape and is adapted to slidably fit the guideways formed by shoulders 56' at the inner edges of wall portions 56 and is movable in a circular path to open and close opening 59. The cover 3 is flush with the external surfaces of wall portions 56 and overlaps back wall portion 71 and the back edge of bottom wall 48 and has a back portion 60, which extends below the bottom wall 48 of receptacle 2 in the open or closed position of the cover between back wall 28 and bottom 48. Wall portions 56 similarly extend below bottom 48, as shown in FIGS. 5 and 14, to be secured to partition 14 by screws 81. Back cover portion 60 is of reduced width, as shown in FIG. 5, and its rear edge is secured to a bar 61 perpendicular thereto and to each end of which is secured a radial arm 62 by means of screws 63 (see FIG. 15). Each radial arm 62 is pivotally mounted at its radially inner end and surrounds a pivot pin 64, which is carried at its ends by brackets 65 secured to partition wall 14 by screws 82. The pivot pin 64 is located at the center of rotation of cover 3 and, for this purpose, the bottom wall 48 of receptacle 2 forms a boss 66 at the center zone of the bottom wall to receive the pivot pin 64. Thus, the cover 3 being pivoted about pin 64 is retained in slidable contact with its guideways 57.

Bar 61 carries at each end a laterally extending abutment member 67 in the form of a bar extending laterally outwardly of the cover 3. A lever 68,68' is arranged on each side of the advertising chamber 17, being pivoted to the outside of each wall 12 at 69 and extends rearwardly of the casing to overlie the associated abutment member 67. Each lever 68,68' is connected to the associated lever 4 or 4' by a rigid link 70, 70' respectively.

As shown in FIG. 14, when the actuator lever is in elevated position, as shown by lever 4', its associated lever 68' is also in elevated position and out of contact with the associated abutment member 67 when said abutment member 67 on the other side of the casing has been moved downwardly by the lever 68 pulled down by its link 70 upon depression of associated actuator lever 4. Thus, either one of the actuators 4 or 4' may be used to open the cover and the other lever and associated mechanism 70,68 will remain in elevated rest position.

The part of wall 71 below the bottom wall 48 carries idle pulleys 72, one on each side of the casing, and each located in a slot 73 made in wall 71, as shown in FIG. 5.

A flexible rope 74 is trained on pulley 72 at both sides of the casing and has one end attached to abutment member 67, while the other end is attached to a rod 75, which extends horizontally in the back portion of the lower casing part 5.

A pair of weights 76 are fitted on rod 75. Thus, these weights act on the cover 3 to close the same when both levers 4,4' are released and returned in their elevated position by the return springs 29, the upper ends of the latter being attached to wall portions 56. Means are provided to slow down the closing movement of the cover 3. For this purpose, a cylinder and piston unit 77 extends between the rod 75 and the bottom plate of the casing. More particularly, the cylinder 78 is connected to the rod 75 intermediate the two weights 76, while the piston rod 79 is pivotally connected to a pair of ears 80 integral with and upstanding from base 9 at a point forward of back wall 28.

The unit 77 is air operated and is similar to a bicycle air pump. Its piston is so arranged that it compresses the air in front of the piston upon downward movement of the weight 76 and consequent contraction of the unit 77 and the compressed air flows to the underside of the piston through a restricted opening. Upon elongation of unit 77, the air at the underside of the piston flows through a more enlarged opening on the upper side of the piston. In practice, the piston itself is flexible to restrict the air flow upon shortening of the unit and increase the air flow upon elongation of the unit. Thus, there is a uniform resistance to the falling down of the weights 76, but practically no resistance to their elevation. The unit 77 may be adjustable to vary the rate at which the cover will close. The rate is selected so as to give time to the operator, after he has pressed down on one of the actuators 4 or 4' with a finger F of one hand, to release said actuator and reach within opening 59 of receptacle 2 and grasp a sugar bag, or the like, in said receptacle, all with the same hand and before the cover has had time to close to any substantial extent. Obviously, cover 3 can be stopped by the operator in any position during its closing movement. It will be noted that weights 76 are urged against back wall 28 because the longitudinal axis of unit 77 is inclined upward towards back wall 28. Thus, back wall 28 serves to guide the weights 76 in their up and down movements.

As previously noted, one or the other of actuators 4, 4' may be pressed down to open the cover 3 without the other actuator and associated motion transmitting mechanism being actuated. Thus, very light finger pressure is necessary to open the cover.

It will be noted that all of the mechanism for opening and closing the cover is arranged in the lower casing part 5 below the receptacle 2 and, therefore, the latter can be made of transparent material and only the sugar bags or the like food packages will be visible therethrough. The cover, being normally maintained in closed position, will keep the food content in sanitary and clean condition.

It will be noted that each time an operator actuates lever 4, 4' to open closure 3, all of the advertising units 8 are rotated through 120° to present another advertising message on each of said units.

What we claim is:

1. A food package dispenser comprising a table top casing defining a package receptacle having an access opening, a cover for said opening, mounted on said casing for movement between receptacle opening and closing positions, a manually operated actuator member movably mounted on said casing for movement between rest position in which said cover is closed and active position in which said cover is opened, a motion transmitting mechanism connecting said actuator member with said cover, operative only when said actuator member moves from said rest position to said active position, whereby operation of said actuator member causes opening of said cover, means to return said cover into closing position upon return of said actuator member to rest position, and closing movement slowing down means to allow time for the operator's hand, once actuation of said actuator member is completed, to release said actuator member and reach within the still open receptacle to grasp a package therein, said means to return said cover into closing position including a weight means attached to said cover to urge the latter into closing position by gravity and said closing movement slowing down means including a cylinder and piston fluid unit, in which movement of the piston is retarded by a restricted passage of the fluid in the cylinder from one side to the other of the piston, one end of said unit being connected to said weight means, while the other end of said unit is connected to said casing.

2. A food package dispenser comprising a table top casing defining a package receptacle having an access opening, a cover for said opening, mounted on said casing, for movement between receptacle opening and closing positions, at least two spaced manually operated actuator members movably mounted on said casing for movement between rest position in which said cover is closed, and active position in which said cover is open, a motion transmitting mechanism associated with each actuator member and each operative to open said cover only when the associated actuator member moves from said rest position to said active position, but inoperative to close said cover, whereby one actuator remains in rest position when the other actuator moves to active position and returns to rest position and whereby operation of anyone of said actuator members causes opening of said cover, means to return said cover into closing position upon return of an actuator member from active to rest position and closing movement slowing down means to allow time for the operator's hand once actuation of an actuator member is completed, to release said actuator member and reach within the still open receptacle to grasp a package therein.

3. A food package dispenser as claimed in claim 2, wherein said receptacle has a bottom and partially cylindrical lateral sections forming partially cylindrical guideways, said cover having partially cylindrical lateral portions slidably fitting said guideways to be guided by the latter for circular opening and closing movement, said closure carrying abutment members disposed below said bottom, each actuator consisting of a first lever pivoted on said casing for vertical pivotal movement and disposed below said bottom, each motion transmitting mechanism consisting of a second lever disposed below said bottom, pivotally mounted in said casing, and overlying one of said abutment members and a link pivotally connecting said first and second levers, whereby downward movement of said first lever causes downward movement of said second lever which presses on said abutment member to open said closure, and spring means to return the assembly of the two levers in elevated rest position.

4. A food package dispenser as claimed in claim 2, wherein said casing has a back wall and a base, said receptacle has a bottom and lateral sections forming partially cylindrical guideways, said cover having partially cylindrical lateral portions slidably fitting said guideways to be guided by the latter for circular opening and closing movement, said cover having a portion disposed below said receptacle bottom, said means to return said cover into closing position including pulley means mounted in said casing below said receptacle bottom and close to said back wall near each side of said casing, rope means trained on said pulley means and attached to said cover portion, a horizontal rod extending along said back wall and attached to said rope means at its ends and weights mounted on said rod, said closing movement slowing down means including a cylinder and piston unit in which movement of the piston is retarded by a restricted passage of the fluid in the cylinder from one side to the other of the piston and is free to flow in the reverse direction with respect to the piston, said unit connected to said rod at one end and having its outer and pivotally connected to said base at a point spaced forwardly from said back wall, so that its longitudinal axis is inclined upwardly towards said back wall, whereby said cylinder and piston unit urges said weights in guided slidable contact with said back wall.

5. A food package dispenser comprising a table top casing defining a package receptacle having an access opening, a cover for said opening, mounted on said casing for movement between receptacle opening and closing positions, a manually operated actuator member movably mounted on said casing for movement between rest position in which said cover is closed and active position in which said cover is opened, a motion transmitting mechanism connecting said actuator member with said cover, operative only when said actuator member moves from said rest position to said active position, whereby operation of said actuator member causes opening of said cover, means to return said cover into closing position upon return of said actuator member to rest position, and closing movement slowing down means to allow time for the operator's hand, once actuation of said actuator member is completed, to release said actuator member and reach within the still open receptacle to grasp a package therein, said receptacle having a bottom and partially cylindrical lateral sections forming partially cylindrical guideways, said closure having partially cylindrical lateral portions slidably fitting said guideways, to be guided by the latter for circular opening and closing movement, said cover having a portion extending below said bottom in all positions of said cover, a pivot pin carried by said casing at the axis of circular movement of said cover, arms pivotally carried by said pivot pin and secured to said cover portion to maintain said cover in slidable contact with said guideways.

6. A food package dispenser as claimed in claim 5, wherein said receptacle forms the upper portion of said casing, the lower portion of said casing providing a front wall from which said actuators protrude at laterally spaced portions of said front wall.

* * * * *